Patented Oct. 25, 1938

2,134,336

UNITED STATES PATENT OFFICE 2,134,336

DEWAXING MINERAL OIL

Edwin C. Knowles, Beacon, N. Y., assignor to The Texas Company, New York, N. Y., a corporation of Delaware No Drawing. Application November 18, 1935, Serial No. 50,407

3 Claims. (Cl. 196—18)

This invention relates to the separation of wax from oil.

The invention contemplates a process for dewaxing wax-bearing mineral oil in the presence of a solvent or diluent liquid in which a wax crystal modifying substance is added to the oil or to a mixture of the wax-bearing oil and solvent, and the resulting mixture of oil, added material and solvent heated to an elevated temperature prior to chilling. Thereafter, the heated mixture is chilled to precipitate the wax constituents, and the precipitated wax separated from the cold mixture by filtration, centrifuging, or settling.

The present application is a continuation-in-part of my pending application, Serial No. 41,393, filed September 20, 1935, for Dewaxing mineral oil.

The present invention comprises a specific modification of the broad invention therein disclosed, namely, the addition of a wax crystal modifying material to the oil, or to the mixture of oil and dewaxing solvent, and then heating the mixture containing this modifying material to an elevated temperature prior to chilling, in accordance with the novel process of my invention.

The novel dewaxing process disclosed in my pending application comprises mixing wax-bearing oil with a solvent, such as a mixture consisting of 35% acetone and 65% benzol, and heating the mixture of oil and solvent to a temperature in the range of 125° to 175° F. prior to chilling. This heated mixture is then chilled to a temperature of 0° F. and below in order to precipitate the wax, and the resulting precipitated wax removed therefrom by mechanical means.

I have found that heating the mixture of oil and solvent to a temperature of from 15° to 50° above the minimum temperature at which the wax and oil appear to be completely dissolved in the solvent exerts a beneficial effect upon the crystalline structure of the wax precipitated so that the wax is more readily separated from the mixture, and can be more rapidly filtered therefrom. As a consequence, the filter rates may be increased very greatly over the rate obtaining in the ordinary dewaxing procedure where the heating step of my invention is omitted.

The minimum temperature at which the wax-bearing oil appears, on visual inspection, to be completely soluble in the dewaxing solvent, or in homogeneous admixture therewith, depends upon the nature of the oil as well as upon the solvent. With a selective dewaxing solvent of the character of a mixture of about 30% acetone and 70% benzol, for example, the minimum temperature of apparent complete solution of wax-bearing oil in the solvent may range from around 90° to 125° F., the minimum temperature for relatively viscous oils being in the upper portion of this temperature range.

I have found that this method of dewaxing is particularly advantageous in the case of relatively viscous wax-bearing oils, that is, oils having a viscosity above about 80 Saybolt Universal seconds at 210° F.

It is thought that viscous oils of this character contain naturally-occurring asphaltic constituents of a resinous character which partake of the nature of a wax crystal modifying substance under certain conditions. These constituents are believed to be less soluble than wax in the dewaxing solvent liquid, and at the minimum temperature at which the wax-bearing oil appears to be in complete solution, these constituents are not in true solution but rather are present as a colloidal solution.

In this form, these constituents possibly form films on the small plate-type paraffin crystals formed during preliminary precipitation of the wax from the solution, and these films inhibit the normal transformation of the plate-type wax crystals into the more easily filterable type of crystals.

It is believed that, upon heating the mixture of oil and solvent as above disclosed, this colloidal or wax crystal modifying substance is completely dissolved in the solvent. Then upon chilling the thus heated solution, this material precipitates from the solution substantially co-extensively with the wax in the form of nuclear particles which facilitate crystallization of wax in a more readily separable and filterable form. It is thought that the optimum effect is realized when the modifying substance continues to precipitate from the solution over the entire range of wax crystallization.

I have discovered that the above mentioned improvements in rate of wax separation and yield of wax-free oil can be realized in the case of dewaxing relatively less viscous oils where a wax crystal modifying material is added to the oil and the mixture of oil, added material and solvent liquid, heated as above, prior to chilling. These wax-bearing oils of relatively low viscosity as, for example, up to about 75 Saybolt Universal seconds at 210° F. appear to be deficient in the naturally-occurring resinous constituents, above referred to. The addition of a suitable wax-crystal modifying substance to these oils, however, permits the application of my novel process of dewaxing to such oils with substantially the same improved results. In some instances, however, it may be advantageous to add a suitable wax crystal modifying material to the relatively more viscous oils, and dewax them in accordance with the process of my invention.

Wax crystal modifying materials which I have found suitable for use in connection with the carrying out of my invention comprise aluminum stearate, Montan wax, mixtures of aluminum stearate and Montan wax, and synthetic modifying substances, such as derived by condensation of chlorinated wax and naphthalene. A suitable synthetic material, for example, comprises the synthetic hydrocarbon oil formed by the condensation of a waxy hydrocarbon material with an aromatic hydrocarbon, and known in the industry as Paraflow.

In carrying out my invention, various solvents may be employed, as the dewaxing solvent liquid, including selective solvents such as a mixture of acetone and benzol, or the diluent type of solvent, such as naphtha or relatively low-boiling petroleum hydrocarbons.

Selective dewaxing solvents may thus comprise aliphatic ketones, such as acetone or benzol mixed with benzol and its homologs; mixtures of a low molecular weight ketone and a high molecular weight ketone, such as methyl ethyl ketone and dipropyl ketone; mixtures of an aliphatic ether and an aliphatic ketone, such as isopropyl ether and methyl ethyl ketone.

Petroleum fractions suitable as a diluent type of solvent may comprise hydrocarbons, such as propane, butane, pentane, etc., up to nonane or mixtures thereof. It is also contemplated that the petroleum hydrocarbon type of solvent may be used in conjunction with a wax antisolvent liquid, such as acetone and methyl ethyl ketone.

According to the process of my invention, from 0.1 to 1.0% of wax crystal modifying substance is added to the oil or to the mixture of oil and dewaxing solvent. This mixture is then heated to a temperature of from 15° to 90° above the minimum temperature at which the wax and oil appear to be completely dissolved in the solvent. Thereafter, the mixture is chilled to a temperature of from 0° F. to —30° or —40° F. to precipitate the wax. The precipitated wax is then separated from this cold mixture by filtering, centrifuging, etc.

In order to further illustrate the improved results obtained by the process of my invention, reference will now be made to the following experiments in which a wax distillate, derived from Mid-Continent crude, and previously subjected to solvent refining with furfural, was dewaxed. This oil had the following characteristics:

| | |
|---|---|
| Gravity, °A. P. I. | 28.3 |
| Flash, °F | 500 |
| S. U. vis. @ 210° F | 69–70 |
| Pour, °F | 115 |
| Per cent paraffin | 10.4 |

The dewaxing solvent used in these experiments comprised a mixture of equal parts of methyl ethyl ketone and isopropyl ether, and was mixed with the oil in the proportion of four parts of solvent liquid to one part of oil. In each instance, the wax crystal modifying material was added to the oil-solvent mixture, and the mixture then heated to the temperatures indicated. Thereafter, the mixture was chilled to a temperature of 0° F. and filtered in a pressure filter to produce a filtrate which, after removal of the solvent, had a pour test of around +10° F.

The heating, chilling and filtering steps were carried out in an apparatus and in a manner similar to that disclosed in my pending application, already referred to. The mixture of oil and solvent was subjected to relatively mild agitation during the chilling step by bubbling an inert gas through the mixture.

Comparative tests were made as follows:
A. In the absence of a wax crystal modifying substance;
B. Using Paraflow;
C. Using Montan wax; and
D. Using aluminum stearate.

| Percent modifying substance by weight of wax-bearing oil | Heating temperature | Filter rate* | Percent yield of wax-free oil | Percent paraffin in slack wax |
|---|---|---|---|---|
| *A—No modifying substance* | | | | |
| 0.0 | 108 | 5.6 | 55 | 27 |
| 0.0 | 170 | 11.0 | 56 | 28 |
| *B—Paraflow* | | | | |
| 0.23 | 110 | 6.7 | 61 | 29.5 |
| 0.23 | 165 | 60.0 | 78 | 52.5 |
| 1.0 | 112 | 17.5 | 68 | 34.5 |
| 1.0 | 121 | 16.5 | 68 | 32.5 |
| 1.0 | 165 | 60.0 | 78 | 51.0 |
| *C—Montan wax* | | | | |
| 0.23 | 115 | 15.6 | 66 | 30.5 |
| 0.23 | 165 | 46.0 | 78 | 50.5 |
| *D—Aluminum stearate* | | | | |
| 0.25 | 113 | 4.5 | 53 | 26.0 |
| 0.25 | 170 | 60.0 | 75 | 49.0 |

*Gallons of wax-free oil per square foot of filtering surface per hour (calculated on the basis of time required for the passage of equal volumes of wax-free oil through the filter surface, i. e., 0.2 gallons per square foot of filtering surface.

As shown from the foregoing date, with 0.23% Paraflow, the filter rate was increased from 6.7 to 60 gallons, and the yield of wax-free oil increased from 61% to 78% (without subjecting the filter cake to a solvent wash) by increasing the solution temperature from 110° F. to 165° F.

Somewhat similar results were obtained with aluminum stearate where an increase of solution temperature from 113° F. to 170° F. improved the filtration rate from 4.5 to 60 gallons, and increased the yield of wax-free oil from 53% to 75%.

The results obtained with Montan wax show the same general trend of improvement, although to a somewhat less degree.

It will be observed that in the blank runs increasing the solution temperature from 108° to 170° F. only increased the filtration rate from 5.6 to 11 gallons, with a correspondingly small increase in the yield of wax-free oil, and yield of paraffin in the slack wax.

Thus, by the practice of my invention, it is possible to increase the filter rate by three to twelve times. The yield of wax-free oil, without subjecting the filter cake to solvent washing, is increased by about 10% to 22%, while the paraffin content of the slack wax is increased by about 15% to 23%.

The wax cake is of a firm, dry, compact nature, and its volume is reduced by about one-half.

The invention is not limited to using any particular ratio of solvent to oil, and the proportion of solvent may vary from about one to six parts to one part of oil. Excellent results are obtained by the process of my invention with comparatively low solvent oil ratios as, for example, one to two parts of solvent to one part of oil. I have found that the results obtained with these low ratios may be even superior to those obtained by the prior art dewaxing methods when using higher dilution ratios.

The wax crystal modifying material, as already indicated, may be added either to the oil or to the mixture of oil and solvent. In the case of aluminum stearate, for example, it may be advantageous to add the material in the form of a concentrated gel formed by mixing a small amount, up to about 10%, of the soap with some low viscosity lubricating oil while under the influence of heat. The resulting gel is then incorporated into the main body of wax-bearing oil and solvent in the proper proportion so that the wax bearing oil contains about 0.25% by weight of the soap.

The temperature to which the mixture of wax bearing oil, modifying material and solvent is heated prior to chilling will depend upon the oil as well as upon the solvent. When the dewaxing solvent is a selective type such as a mixture of acetone and benzol the mixture should be heated to a temperature in the range 125° to 175° F. With a petroleum hydrocarbon type of solvent such as pentane, the temperature of heating is in the range 140 to 190° F., somewhat higher temperatures apparently being necessary with this latter type of solvent.

Obviously, many modifications and variations of the invention, as hereinbefore set forth, may be made without departing from the spirit and scope thereof, and therefore only such limitations should be imposed as are indicated in the appended claims.

I claim:

1. The method of dewaxing a wax-bearing mineral oil which comprises mixing the oil with a selective solvent having complete selective action as between wax and oil at about 0° F., incorporating in the mixture a small amount of wax crystal modifying material, heating the mixture to a temperature of around 160 to 170° F. such that upon chilling to about 0° F. and filtering a wax cake is secured having a volume not more than about one-half the volume secured by heating only to about said apparent solution temperature, chilling the mixture to about 0° F. or below, and filtering out the wax thus precipitated.

2. The method of dewaxing a wax-bearing mineral lubricating oil which comprises mixing the oil with a normally liquid solvent of such character and in such proportion with the oil that the wax and oil appear to be completely dissolved in the solvent at a temperature of 125° F., incorporating in the mixture a small amount of wax crystal modifying material, heating the mixture to a temperature of around 165° F. such that the wax and oil remain completely dissolved in the solvent at the elevated temperature and such that upon chilling the heated mixture to around 0° F. and filtering to remove the wax the rate of filtration is from three to twelve times as rapid as when the mixture is heated only to about said apparent solution temperature, chilling the mixture to a temperature of 0° F. and below, and filtering the chilled mixture to remove the precipitated wax.

3. The method of dewaxing wax-bearing oil deficient in naturally-occurring wax crystal modifying material which comprises mixing the oil with a dewaxing solvent in which the wax and oil appear to be completely dissolved at a temperature of 125° F., incorporating therein a small amount of wax crystal modifying material, heating the mixture to a temperature of 160 to 170° F. such that upon chilling and filtering the chilled mixture to remove the wax, the rate of filtration is unexpectedly more rapid than when the mixture is heated only to 125° F., chilling the mixture to a temperature of 0° F. and below, and filtering out the wax thus precipitated.

EDWIN C. KNOWLES.